US006950859B1

(12) United States Patent
Bartek et al.

(10) Patent No.: US 6,950,859 B1
(45) Date of Patent: Sep. 27, 2005

(54) WIRELESS CABLE REPLACEMENT FOR COMPUTER PERIPHERALS

(75) Inventors: David J. Bartek, Frisco, TX (US); Richard M. Barrett, Jr., Capistrano Beach, CA (US); Yashodhara Devadiga, San Diego, CA (US); Sarath Babu Govindarajulu, San Diego, CA (US); Kim Phuong Tran, San Diego, CA (US); Suresh Kumar Singamsetty, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 212 days.

(21) Appl. No.: 10/329,102

(22) Filed: Dec. 23, 2002

(51) Int. Cl.⁷ .............................. G06F 15/16; H04B 1/69
(52) U.S. Cl. ....................... 709/217; 709/227; 375/130
(58) Field of Search ......... 710/313–315; 375/130–135

(56) References Cited

U.S. PATENT DOCUMENTS

| 6,356,442 B1 * | 3/2002 | Lunsford ................. 361/686 |
| 6,389,560 B1 * | 5/2002 | Chew ........................ 714/43 |
| 6,519,290 B1 * | 2/2003 | Green ...................... 375/259 |
| 6,603,744 B2 * | 8/2003 | Mizutani et al. ........... 370/310 |
| 6,745,047 B1 * | 6/2004 | Karstens et al. .......... 455/556.1 |
| 6,750,902 B1 * | 6/2004 | Steinberg et al. ........ 348/211.3 |
| 2002/0159419 A1 | 10/2002 | Morris |
| 2003/0043771 A1 | 3/2003 | Mizutani et al. ............ 370/338 |
| 2003/0083013 A1 | 5/2003 | Mowery et al. |
| 2003/0204708 A1 * | 10/2003 | Hulme et al. ................ 713/1 |

FOREIGN PATENT DOCUMENTS

| GB | 2 355 375 A | 4/2001 | .......... H04L 29/06 |
| WO | WO 01/16686 A1 | 3/2001 | ............ G06F 3/02 |
| WO | WO 02/30059 A2 | 4/2002 | .......... H04L 12/56 |

OTHER PUBLICATIONS

Haartsen, "Bluetooth-The universal radio interface for ad hoc, wireless connectivity," Ericsson Review No. 3, pp. 110-117, 1998.
"Chapter 4 Architectural Overview," Universal Serial Bus Specification Revision 2.0, pp. 15-24, Apr. 2000.
"Part H:2, HCI USB Transport Layer, An addendum to the HCI document," Bluetooth Specification Version 1.1, pp. 782-796 plus cover page, Feb. 22, 2001.
PCT Written Opinion in International Application No. PCT/US03/41197, dated Jan. 24, 2005, 5 pages.
"Products, Bluetooth Products," CC&C Technologies Inc. 1 page, unknown.
"Bluetooth™ USB, Thanks to COM One Bluetooth™ USB, connect seamlessly and effortlessly, PCs, to share information," COM One—The Telecom Expert, 2 pages, unknown.
"Products, AnyCOM Bluetooth Products," ANYCOM, 1 page, unknown.
"Anycom Bluetooth™ USB Adapter USB-100," ANYCOM, 2 pages, unknown.

(Continued)

Primary Examiner—Tim Vo
(74) Attorney, Agent, or Firm—Baker Botts L.L.P.

(57) ABSTRACT

A method for emulating a physical connection using a wireless connection includes establishing a communication connection with a host controller according to a first communication protocol and establishing a wireless connection with a wireless device coupled to a peripheral. The method further includes receiving a wireless signal comprising registration information for the peripheral formatted according to a second communication protocol and communicating the registration information to the host controller using the communication connection. The communication of the registration information to the host controller allows the host controller to recognize the peripheral.

38 Claims, 5 Drawing Sheets

OTHER PUBLICATIONS

"Products, the TDK Systems Bluetooth brand," TDK Systems, 2 pages, unknown.

"B091H1, Bluetooth Dongle, Wireless Home Network," Bluetooth™ CEF, 1 page, unknown.

"USB Bluetooth™ Adaptor," www.brainboxes.com, 1 page, unknown.

"Data Sheet, 3Com Wireless Bluetooth™ PC Card, USB Adapter, and Printer Adapter," 3COM, 4 pages, unknown.

Morse, "D-Link News Release—D-Link enters Bluetooth connectivity with USB wireless adapter for Apple Macintosh," d-Link U.S.A., pp. 1-3, unknown.

D-Link Installation Guide, D-Link DWB-120M Bluetooth™ USB Adapter, D-Link, 2 pages, unknown.

"Bluetooth Wireless Home-Networking System User's Manual," pp. 1-26, unknown.

PCT Search Report for PCT/US2004/033994, 16 pages, Feb. 4, 2005.

* cited by examiner

WIRELESS CABLE REPLACEMENT FOR COMPUTER PERIPHERALS

CROSS REFERENCE TO RELATED APPLICATIONS

This application is related to U.S. application Ser. No. 10/329,101, filed Dec. 23, 2002 by David J. Bartek et al., and entitled "Wireless Cable Replacement for Computer Peripherals Using a Master Adapter."

TECHNICAL FIELD OF THE INVENTION

This invention relates in general to computer systems, and more particularly to techniques for wireless cable replacement for computer peripherals.

BACKGROUND OF THE INVENTION

Universal Serial Bus (USB) connections provide a flexible and adaptable method for connecting peripheral devices to computers. The ability of USB devices to "plug and play" as well as the wide array of USB devices available make USB devices a common staple of computing accessories. As USB devices become more and more common, technologies that provide increased USB functionality become increasingly valuable.

SUMMARY OF THE INVENTION

In accordance with the present invention, the disadvantages and problems associated with cable-based peripheral connections have been substantially reduced or eliminated. In particular, certain embodiments of the present invention provide a wireless substitute for physical connections to peripherals. This allows greater mobility for both the computers and the peripherals without depriving the computer of peripheral functions or requiring that the peripherals be moved around with the computer.

In accordance with one embodiment of the present invention, a method for emulating a physical connection using a wireless connection includes establishing a communication connection with a host controller according to a first communication protocol and establishing a wireless connection with a wireless device coupled to a peripheral. The method further includes receiving a wireless signal comprising registration information for the peripheral formatted according to a second communication protocol and communicating the registration information to the host controller using the communication connection. The communication of the registration information to the host controller allows the host controller to recognize the peripheral.

In accordance with another embodiment of the present invention, a system includes a master adapter and a slave adapter. The slave adapter receives data having a format specified by a communication protocol and communicates the data as a wireless signal. A wireless interface of the master adapter receives the wireless signal and extracts the data. A host controller of the master adapter establishes a communication connection with a peripheral according to the communication protocol and communicates the data to the peripheral.

Important technical advantages of certain embodiments of the present invention include increased mobility of computers and peripherals. In the case of peripherals that are difficult to move, a wireless connection allows a computer to access the immobile peripheral from a variety of locations. For example, a cable modem may need to be placed next to an incoming cable wire, while a printer might be placed near a paper supply. A wireless connection allows a computer to be moved around within the range of the wireless connection without losing access to peripherals or requiring that the peripherals be moved along with the computer. This is particularly useful in the case of computers that are relatively easy to move, such as laptops, used in conjunction with devices that require power, cable or telephone outlets in fixed locations.

Other important technical advantages of certain embodiments of the present invention include peripheral sharing. Rather than monopolizing a single physical port, several wireless connections may share access to a single peripheral through wireless connections. This allows peripheral to be used by multiple computers in a wireless neighborhood. Similarly, a single physical port on a computer may be connected to a wireless hub that supports multiple wireless peripheral connections. This allows the computer to access multiple peripherals using a single port.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
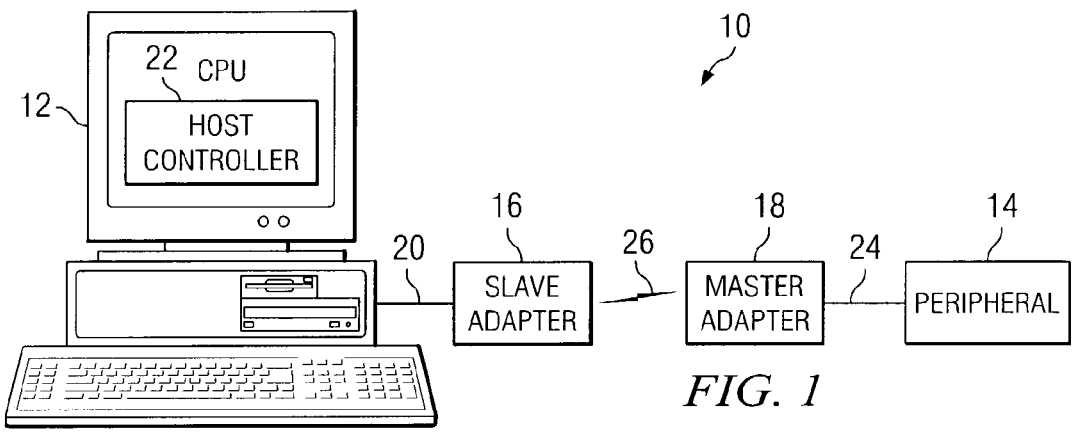
FIG. 1 illustrates a system allowing wireless communication between a computer and a peripheral according to a particular embodiment of the invention.

FIG. 1 illustrates a particular embodiment of a system 10 that wirelessly couples a computer 12 to a peripherals 14. System 10 includes a slave adapter 16 coupled to computer 12 and master adapter 18 coupled to peripherals 14. In general, system 10 permits computer 12 to exchange information with peripheral 14 as if peripheral 14 were coupled to computer 12 using a wireline connection. System 10 thus provides a virtual connection that stands in place of a physical connection, such as a cable, allowing computers 12 to use existing physical ports to effective couple to peripherals 14 using a virtual cable.

Although a particular embodiment of system 10 is depicted with a wireless connection replacing a physical connection between computer 12 and peripheral 14, the techniques of various embodiments of the present invention are adaptable to a wide variety of virtual connections in place of physical connections. The respective physical connections to computer 12 and peripheral 14 can include any suitable form of communication, including Internet protocol (IP), Ethernet, asynchronous transfer mode (ATM), and synchronous optical network (SONET), and/or serial protocols, such as RS232, IEEE 1394, or Universal Serial Bus (USB) 1.1 or 2.0. Computer 12 and peripheral 14 may use different communication protocols, so that virtual connection replaces both the physical connection and any intervening protocol converters. The virtual connection itself may include any number and type of intervening protocols, whether wireline or wireless, examples of which include IP, ATM, SONET, serial protocols, Ethernet, radio frequency coaxial cable, RS 232, Firewire, General Packet Radio Service (GPRS), 802.11 WiFi, satellite links, or any other communication protocol in any suitable medium. In general, virtual connection may include any number or combination of wireless and/or wireline segments. Physical and virtual connections may carry information in any suitable form, including packets, cells, frames, segments, fragments, or other portions of data (all of which are described with the general term "packets"). Because the described techniques are adaptable to a wide variety of physical and virtual connections, the description of particular embodiments that replace a physical connection with a wireless connection are illustrative examples rather than exclusive ones.

Computer 12 represents any collection of hardware or software components for processing and exchanging information, running applications, generating output, performing calculations, or any other suitable computing task. Examples of computers 12 include personal computers (PCs), laptops, and servers. Computer 12 includes any necessary or suitable microprocessing components, such as microprocessors, micro-controllers, or digital signal processors (DSPs), and memory components, such as optical storage, magnetic storage, or removable media, whether volatile or non-volatile. Computer 12 also includes inputs and outputs allowing computer 12 to exchange information with users.

In order to communicate with peripheral 14, computer 12 exchanges information according to a communications protocol using physical connection 20. Physical connection 20 represents any suitable physical medium for communicating information including insulated wires, shielded twisted pairs, coaxial cable, optical fiber, or any other physical connection for propagating signals. The communication protocol used to communicate the information may be any suitable protocol for the medium, examples of which include Internet protocol (IP), Ethernet asynchronous transfer mode (ATM), and synchronous optical network (SONET), and/or serial protocols, such as RS232, IEEE 1394, or Universal Serial Bus (USB) 1.1 or 2.0.

In a particular embodiment, connection 20 is a Universal Serial Bus (USB) connection 20 that allows computer 12 to exchange information with peripheral 14 using a USB protocol. Computer 12 manages these USB connections using a host controller 22. Host controller 22 includes hardware and/or software that detects USB devices coupled to computer 12, establishes communication connections with the device, identifies the type of device, and manages information exchange in the communication connections. For example, host controller 22 may regulate the rate of information exchange, identify particular types of information using headers, selectively route information to particular components of computer 12, or perform other similar management tasks.

Peripherals 14 are specialized devices that perform delegated tasks at the direction of computer 12. Examples of peripherals 14 include printers, scanners, digital cameras, modems (such as 56K, cable, DSL), joysticks, webcams, personal digital assistants (PDAs), mice, and keyboards. Peripherals 14 may include any suitable processing capacity, memory, or interfaces for performing their assigned tasks. Peripherals 14 may exchange information using physical connections 24, which represent any suitable medium for propagating signals, including any of the examples listed above for connection 20. In a particular embodiment, peripherals 14 are USB devices that exchange control information using USB protocol. In such an embodiment, peripherals 14 maintain registration information that may be communicated to a USB master device, such as computer 12 in order to establish a USB connection with the master device.

Slave adapter 16 represents a wireless communication device that appears as a peripheral 14 to computer 12 when physically coupled to computer 12. Slave adapter 16 establishes a wireless connection 26 with master adapter 18 that allows slave adapter 16 to exchange information according to any suitable wireless protocol. The term "establish" as used in this specification may refer to accepting a request for a wireless communication or initiating the request; it need not be limited to one or the other. As part of establishing connections, slave adapter 16 may detect wireless devices, negotiate parameters for establishing communications, regulate information flow, negotiate a communication frequency, or perform any other suitable management task. In a particular embodiment, slave adapter 16 exchanges information wirelessly according to the Bluetooth wireless protocol, which provides standards for performing the detection and negotiation of wireless connections.

Master adapter 18 represents a wireless communication device that appears as a host controller 22 to peripheral 14. Master adapter 18 has the additional ability to establish and manage communication connections with peripherals 14 using physical connections 114. Consequently, master adapters 18 may receive information from peripherals 14 and communicate that information to other devices using wireless connections 26. Conversely, master adapters 18 may receive information from wireless connection 26 and communicate the information to peripheral 14. In a particular embodiment, master adapter 18 establishes a USB connection with peripheral 14, and communicates with slave adapter 16 using the Bluetooth wireless protocol.

In operation, slave adapter 16 becomes operational when it is coupled to computer 12. At this point, slave adapter 16 may optionally register itself with host controller 22 of computer 12 by communicating registration information for itself to computer 12. In such an embodiment, slave adapter 16 may be controlled by driver software installed in computer 12 once it is registered, allowing computer 12 to configure slave adapter 16 for particular packet sizes, protocols, or other operating parameters. Alternatively, slave adapter 16 may remain inactive until a wireless connection 26 is established with master adapter 18. In such an embodiment, slave adapter 16 does not communicate registration information for itself to computer 12. Instead, slave adapter 16 awaits confirmation that master adapter 18 is coupled to a peripheral 14 and passes registration information from peripheral 14 to computer 12.

Master adapter 18 detects when it is coupled to peripheral 14. In response to detecting the connection to peripheral 14, master adapter 18 collects registration information for the peripheral 14 and establishes a communication connection with the peripheral 14. Master adapter 18 appears as a USB host to peripheral 14, and it may therefore control the operation of peripheral 14.

Before, after, or during the establishment of connection to peripheral 14, master adapter 18 seeks out slave adapter 16 within range of master adapter 18 and establishes wireless connection 26 with slave adapter 16. Slave adapter 16 then communicates a request for registration information from computer 12 to master adapter 18 using wireless connection 26. In response, master adapter 18 communicates registration information for peripheral 14 to slave adapter 16. Slave adapter 16 in turn communicates the registration information to computer 12 using physical connection 20. Because computer 12 receives registration information from physical connection 20, computer 12 treats the incoming registration information as if it came from a new peripheral 14 that was just connected to computer 12. Computer 12 thus establishes a virtual communication connection with a peripheral 14, although in reality, slave adapter 16 is the device exchanging information with computer 12. In particular embodiments, master adapter 18 or slave adapter 16 may modify the registration information for peripheral 14 in order to facilitate information exchange over wireless connection 16. For example, master adapter 18 may limit or modify the size of packets communicated by computer 12 in order to utilize wireless connection 26 more efficiently or to utilize USB hardware in slave adapter 16 more effectively.

Slave adapter 16 communicates information received from computer 12 to master adapter 18 by converting the information into a wireless signal. Master adapter 18 in turn receives the information, converts the information to an electrical signal (or other suitable form for physical connection 24), and passes the information to peripheral 14. Since peripheral 14 recognizes master adapter 18 as a USB host, peripheral 14 treats the information received from master adapter 18 as it would treat information received from computer 12 using a wireline connection. Thus, computer 12 effectively controls peripheral 14 in the same manner it would if computer 12 and peripheral 14 were connected using a wireline connection.

Peripheral 14 may also return information to computer 12 by communicating the information to master adapter 18. Because peripheral 14 recognizes master adapter 18 as a master device, the responses returned by peripheral 14 are of the type of responses that would be presented to computer 12 using a wireline connection. Master adapter 18 converts the responses into a wireless signal, which is then communicated to slave adapter 16. Slave adapter 16 extracts the content from the wireless signal and communicates it to computer 12. Computer 12 treats the information as having been received from peripheral 14, and therefore responds as if peripheral 14 were connected to computer 12 using a wireline connection.

The particular types of information exchanged by computer 12 and peripheral 14 may include a number of types of information, such as serial data, voice/audio, video, packets or any other suitable form of information. Information may also be converted in different forms in order to facilitate communication in system 10. One example is a system 10 in which a USB peripheral 14 exchanges information wirelessly with computer 12 over a Bluetooth wireless connection. In such a system, master adapter 18 receives digital data from peripheral 14, and stores the information in Bluetooth packets that contain header information specifying the type of data stored, its source, and other useful information. The Bluetooth packets are communicated as a wireless signal to slave adapter 16, which extracts the original information and communicates the information in USB frames to computer 12. Thus, both computer 12 and peripheral 14 see the connection as a wireline USB connection.

Certain embodiments of slave adapter 16 and master adapter 18 provide secure wireless connections using various techniques. One example of an encryption method is the use of a secure wireless protocol, in which adapters 16 and 18 maintain private and/or public keys used to decode information. 802.11 is one example of a communication protocol that incorporates encryption. Another method of security is to provide exclusive recognition between slave adapter 16 and master adapter 18 so that each device will only establish wireless connections 26 with its counterpart device. For example, slave adapter 16 and master adapter 18 may be programmed with a unique encryption key, and establish connections only with devices that indicate possession of the unique key during an authentication process.

Figure 2:
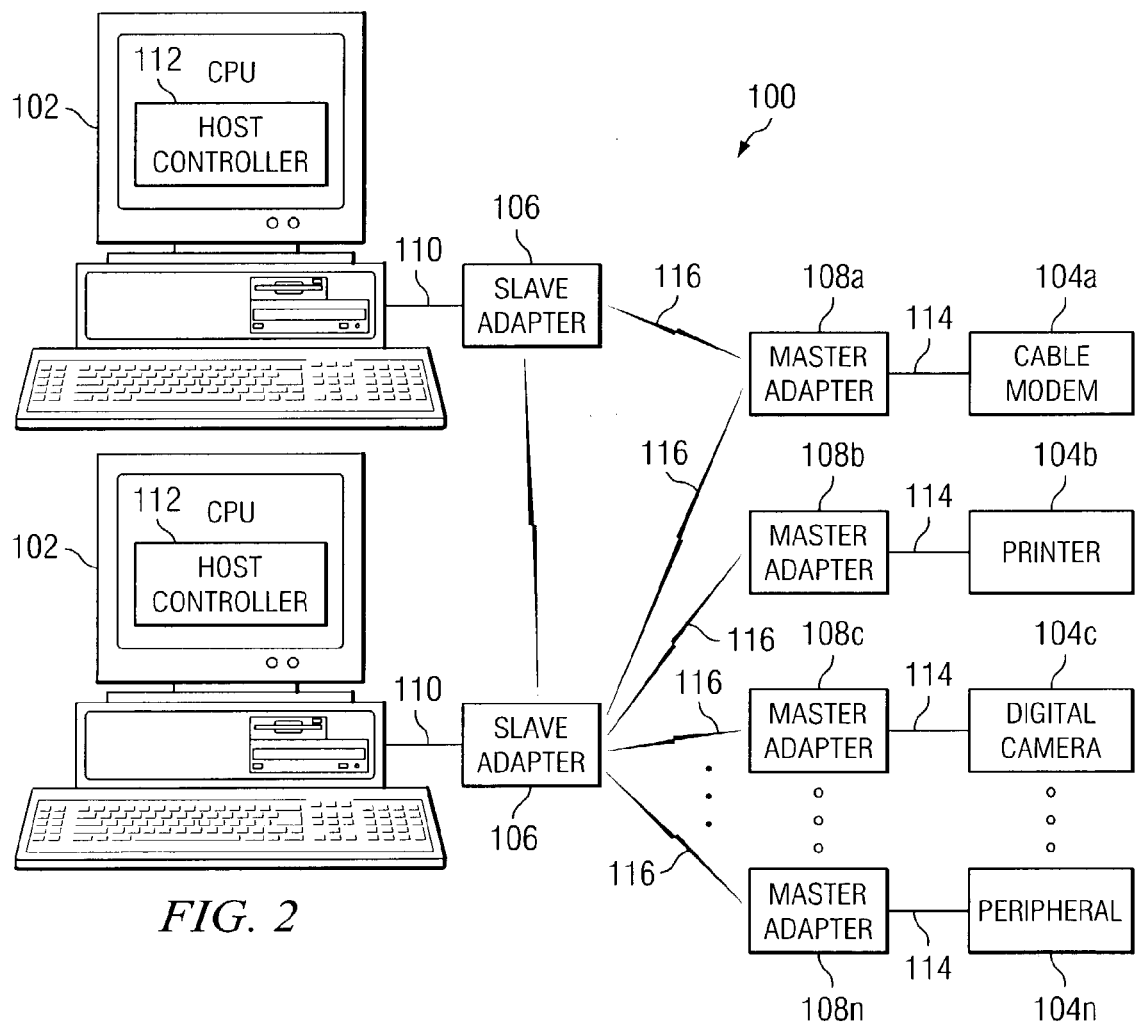
FIG. 2 illustrates a system that allows multiple computers to communicate with multiple peripherals using wireless connections.

FIG. 2 shows another embodiment of a system 100 that allows computers 102 to communicate with peripherals 104a, 104b, 104c, . . . , 104n (collectively referred to as "peripherals 104") using slave adapters 106 and master adapters 108a, 108b, 108c, . . . , 108n (collectively referred to as "master adapters 108"). The components depicted in FIG. 2 correspond to the like components of FIG. 1. Physical connections 110 couple computers 102 to slave adapters 106, while physical connections 114 couple master adapters 108 to peripherals 104. FIG. 2, however, also illustrates that system 100 may include wireless connections between slave adapters 106 and master adapters 108 in a variety of combinations, not limited to a single slave adapter 106 wirelessly connected to a single master adapter 108.

In particular embodiments, slave adapter 106 may maintain multiple wireless connections 116 with multiple master adapters 108. This allows computer 102 to remotely interact with several peripherals 104 using a single physical connection 110. In this manner, slave adapter 106 acts as a wireless hub that allows multiple peripherals 104 to share a single port, where normally, each peripheral 104 might require a separate port. One example of such an embodiment uses the Bluetooth "PicoNet" that allows a Bluetooth device to act as a master for multiple slave devices simultaneously. In embodiments using secure authentication, slave adapter 106 accepts connections only from master adapters 108 that share the correct encryption key.

In other embodiments, multiple slave adapters 106 may communicate with a single master adapter 108 coupled to a peripheral 104. This allows multiple computers 102 in a wireless neighborhood to access the same peripheral 104. Such an embodiment may use the Bluetooth "ScatterNet." ScatterNet allows multiple master devices, such as computers 102, to interact with multiple slave devices, such as peripherals 104. By combining the multiple slave and multiple master capability of ScatterNet with the wireless-to-physical communication capability of adapters 106 and 108, computers 102 may interact with multiple peripherals 104 and even other computers 102 using slave adapter 106.

As noted, in addition to sharing peripherals 104, slave adapters 106 may also communicate with one another, allowing computers 102 to share files, applications and other forms of information. This effectively creates a wireless network of shared computing and peripheral resources. In particular, the use of self-registering slave adapters 106 controlled by driver software in computer 102 may greatly increase the versatility of the wireless network, allowing slave adapters 106 to exchange customized information with one another. More generally, various software applications may extend the capabilities to slave adapters 106 to allow use with hands-free headsets or other wireless devices as well as conventional USB peripherals 104.

In the depicted embodiment, peripherals 104 may also communicate directly with one another. For example, a peripheral 104 such as a digital camera 104c may communicate with printer 104b using their corresponding master adapters 108b and 108c. This allows camera 104c to transfer digital pictures directly to printer 104b using a wireless connection without the need for an intervening computer 102. Such peer-to-peer communications may greatly increase the portability and versatility of specialized peripherals, such as allowing the use of portable photo printers virtually anywhere.

Because of the complex array of component interaction within system 100, system 100 may also include management capabilities in adapters 106 and 108 or additional components of system 100, such as network hubs or servers, in order to maintain registration information, locate peripherals 104 within system 100, and monitor active connections. Such functionality can be localized in a single component accessible by adapters 106 or 108, distributed among illustrated components of system 100, or otherwise suitably incorporated into system 100.

Figure 3:
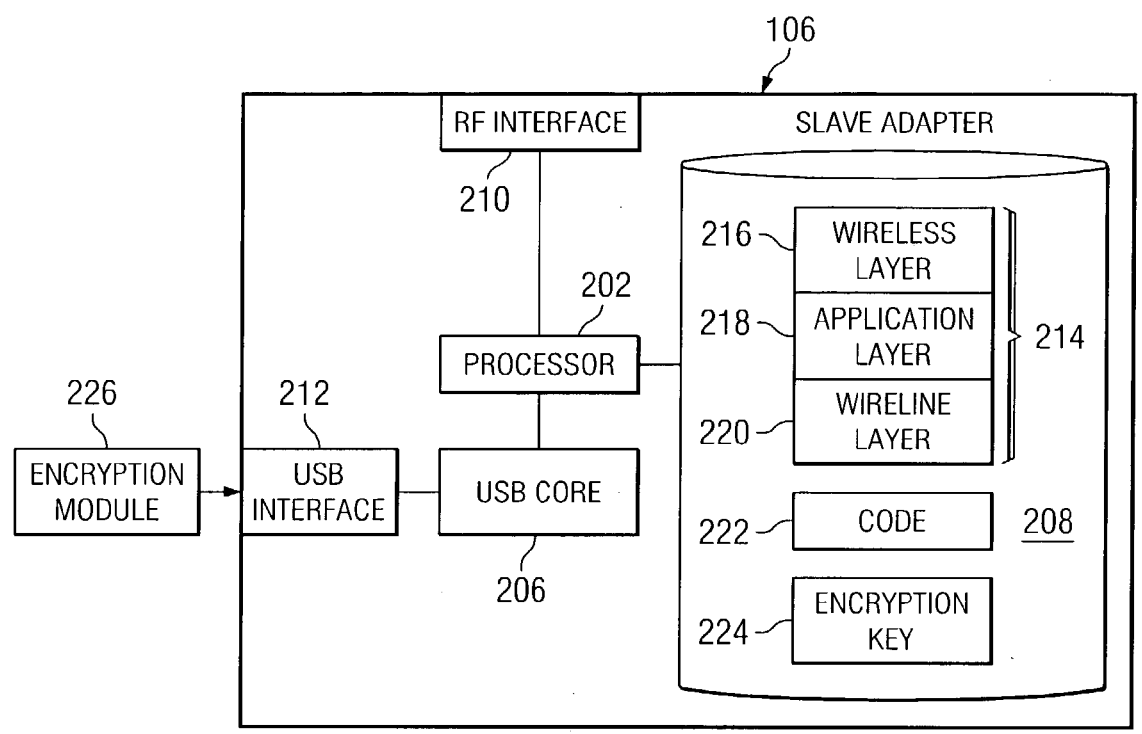
FIG. 3 illustrates one embodiment of a slave adapter used in the system of FIG. 1 or 2.

FIG. 3 illustrates the components of a particular embodiment of slave adapter 106. Slave adapter 106 includes a processor 202, a USB core 206, such as, for example, a USB 1.1 logic module, and a memory 208. Slave adapter 106 communicates with other devices using a radio frequency (RF) interface 210 and a USB interface 212. In general, slave adapter 106 provides wireless connectivity to a remote peripheral 104, while allowing computer 102 to interact with the remote peripheral 104 as if the peripheral 104 were connected to computer 102 using a wireline connection.

Processor 202 represents any combination of hardware and/or software for processing information. In particular applications, processor 202 is sometimes referred to as a "baseband processor," because it handles information exchange with RF interface 210. Processor 202 may include microprocessors, micro-controllers, DSPs, or other suitable components. USB 1.1 logic module 206 is another processor that handles USB protocol exchanges between slave adapter 106 and computer 102. In particular, USB core 206 allows slave adapter 106 to establish USB communication connections with computer 102 when coupled to computer 102, thus allowing slave adapter 106 to appear as a peripheral to computer 102.

RF interface 210 represents hardware and/or software for generating wireless RF signals from information and for receiving wireless signals and extracting information from them, including components such as antennas, power supplies and oscillators. USB interface 212 represents any port or connection, whether real or virtual, that allows slave adapter 106 to exchange information with computer 102 in a format specified by USB protocol. USB interface 212 may include active and passive components for receiving and transmitting electrical signals, such as amplifiers, filters, and other suitable components. USB core 206 regulates the information exchange by USB interface 212. In a particular embodiment, USB interface 212 includes a "B" type USB connector that is soldered to a printed circuit board of slave adapter 106, so that the USB connector is integral to adapter 106.

Memory 208 represents any form of information storage, whether volatile or non-volatile, including magnetic media, optical media, removable media, random access memory (RAM), read-only memory (ROM), or flash memory.

Memory 208 stores software layers 214 executed by various components of slave adapter 106 to perform particular operations. Wireless layer 216 is executed by processor 202 to manage RF connections with other devices and generally controls the operation of RF interface 210. Wireline layer 220 is executed by processor 202 to perform operations associated with the wireline protocol, such as controlling various operations of USB core 206. Application layer 218 is executed by processor 202 to perform conversions between wireless and wireline formats, including amalgamating packets, affixing additional header information, or other suitable conversions. Finally, code 222 represents other instructions that may be executed by processor 202, such as applications that allow slave adapter 106 to interact with driver software of computer 102.

In operation, USB core processes data received from computer 102 by USB interface 212 and communicates data to computer 102 in USB format using USB interface 212. In a particular embodiment, USB core 206 communicates registration information for slave adapter 106 to computer 102, and in response, computer 102 establishes a USB connection with slave adapter 106. In an alternative embodiment, slave adapter 106 remains inactive until wireless connection 116 is established with master adapter 108 connected to peripheral 104. Using RF interface 210, slave adapter 106 monitors for an incoming communication request from master adapter 108, and if a request is received, slave adapter 106 accepts the request, thus establishing wireless connection 116.

To communicate information from computer 102 to master adapter 108, slave adapter 108 first receives information from computer 102 using USB interface 212. USB core 206 communicates the information to processor 202 for any suitable conversion or other processing. For example, processor 202 may convert the information from a wireline format to a wireless packet with a data type specified by profile 222. Processor 202 then presents the information to RF interface 212. RF interface 212 converts the information into a radio signal that is communicated to master adapter 108.

Slave adapter 106 also receives information from master adapter 108 over wireless connection 116. RF interface 210 extracts information from the wireless signal. Processor 202 converts the packets from a wireless format to a wireline format and presents the information to computer 102 in a suitable manner. For example, if there are multiple packets received from several peripherals 104, processor 202 may break the packets up and communicate them separately to computer 102 in a predetermined order.

Particular embodiments of slave adapter 106 use secure wireless communication. In such embodiments, encryption key 224 may be stored in memory 208. Encryption key 224 represents any public and/or private key used by slave adapter 106, which may be inherent to a wireless communication protocol, such as 802.11, or may be a unique encryption key 224 matching a similar key held by master adapter 108. In cases where encryption key 224 is unique, slave adapter 106 may be programmed using an encryption module 226 that couples to USB interface 212 of slave adapter 106. In a particular embodiment, encryption module 226 generates a unique encryption key 224 when slave adapter 106 and master adapter 108 are coupled to encryption module 226, thus providing a unique encryption key 226 held commonly by slave adapter 106 and master adapter 108. Alternatively, encryption module 226 may program any device coupled to it with the same encryption key 224, rather than generating a new key for each pair of devices.

Figure 4:
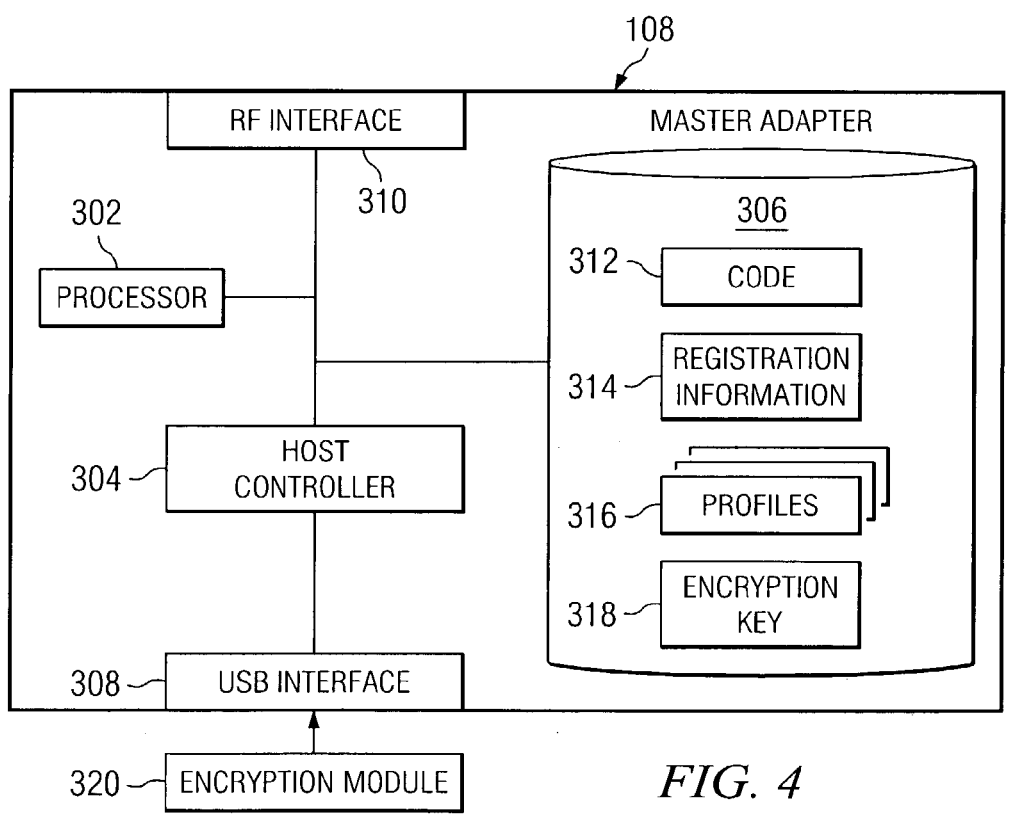
FIG. 4 illustrates one embodiment of a master adapter used in the system of FIG. 1 or 2.

FIG. 4 illustrates a particular embodiment of master adapter 108. In the depicted embodiment, master adapter 108 includes a processor 302, a host controller 304, a memory 306, a USB interface 308 and an RF interface 310. Processor 302, memory 306, USB interface 308, and RF interface 310 are analogous in structure and function to the like components of slave adapter 106, and any of the like components described in conjunction with the slave adapter 106 of FIG. 2 may be used in master adapter 108 as well. Host controller 304 represents hardware and/or software that manages information transfers between master adapter 108 and peripherals 104. In particular, host controller 304 detects peripherals 104 coupled to USB interface 308, obtains registration information for those peripherals 104, and establishes communication connections with the peripherals 104. Host controller 104 also regulates information flow between master adapter 108 and peripheral 104. Host controller 104 may include any suitable components for processing information and executing logical instructions, including management of hardware and protocol layers of USB communication.

In an alternative embodiment of master adapter 108, host controller 304 includes logic for On the Go (OTG) operation in USB, which is included in USB 2.0 logic modules. OTG allows a device to function as both a master USB device and a slave USB device. Such capabilities are particularly useful in systems such as system 100 depicted in FIG. 2, because they allow slave adapters 106 to function as master USB devices when communicating with peripherals 104 and as slaves or masters when communicating with other computers 102. Thus, computers 102 have greater versatility when interacting with other devices in system 100.

Memory 306 stores code 312 executed by processor 302 to perform various tasks of master adapter 108. Memory 306 may also maintain registration information 314, which may include USB endpoint information, for peripherals 104 coupled to USB interface 308. Registration information 314 is used by master adapter 108 to identify peripherals 104 and to manage communication connections with peripherals 104. For example, in a USB embodiment, registration information 314 may include a device identifier the indicates a type of device to a "plug and play" system. Master adapter 108 also maintains profiles 316 for organizing data according to data type, appending suitable headers, converting data from wireless packets, and other tasks specific to the type of data received from peripheral 104.

In operation, master adapter 108 detects a peripheral 104 coupled to USB interface 308 and establishes a communication connection with peripheral 104. Master adapter 108 thus becomes a master device over peripheral 104. Master adapter 108 also detects slave adapter 106 within range of RF interface 310, and establishes wireless connection 116 with slave adapter 106. Once wireless connection 116 is established, master adapter 108 communicates registration information 314 to slave adapter 106, allowing slave adapter 106 to establish a virtual connection between computer 102 and peripheral 104. Effectively, master adapter 108 acts as a transparent connection between computer 102 and peripheral 104. Because of the functionality provided by host controller 304, peripheral 104 recognizes information from master adapter 108 as coming from a USB host.

During information exchanges between computer 102 and peripheral 104, master adapter 108 performs various intermediate tasks to provide a transparent USB connection. For example, if master adapter 108 is one of several master adapters 108, master adapter 108 may store information received from peripheral 104 in packets with a ScatterNet header or other suitable identifier to distinguish the particular peripheral 104 as well as the information type. Master adapter 108 also regulates the exchange of packets with peripheral 104 in terms of classifying information types, regulating the timing of packet delivery, performing any suitable protocol conversion, and generally providing support for the USB connection between computer 102 and peripheral 104.

Particular embodiments of master adapter 108 use secure wireless communication. In such embodiments, encryption key 318 may be stored in memory 306. Encryption key 318 represents any public and/or private key used by master adapter 108, which may be inherent to a wireless communication protocol, such as 802.11, or may be a unique encryption key 318 matching a similar key held by slave adapter 106. In cases where encryption key 318 is unique, master adapter 108 may be programmed using an encryption module 320 that couples to USB interface 308 of master adapter 108. In a particular embodiment, encryption module 320 generates a unique encryption key 318 when slave adapter 106 and master adapter 108 are coupled to encryption module 320, thus providing a unique encryption key 318 held commonly by slave adapter 106 and master adapter 108. Alternatively, encryption module 320 may program any device coupled to it with the same encryption key 318, rather than generating a new key for each pair of devices.

Figure 5:
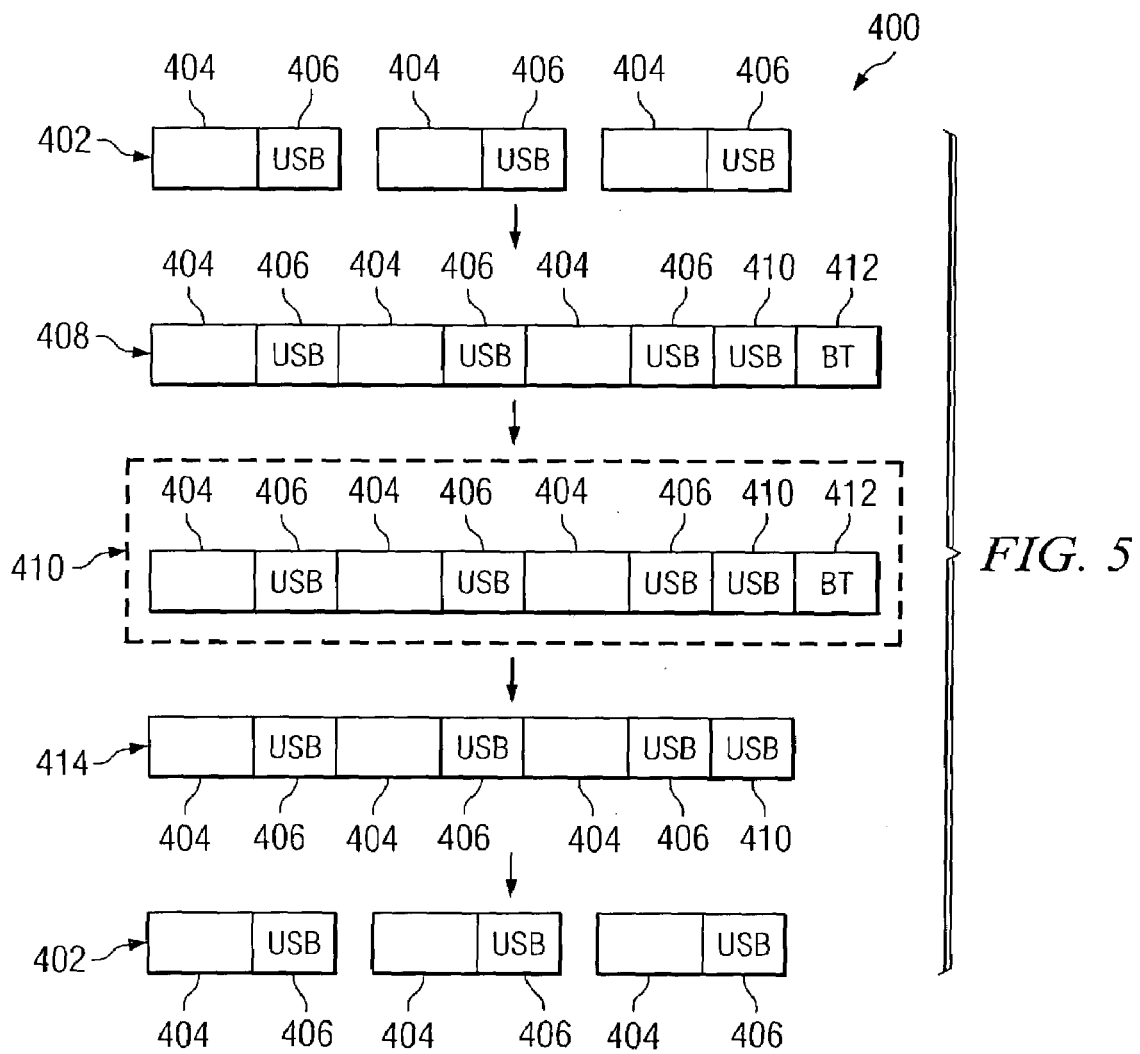
FIG. 5 illustrates an example of information packets communicated in the system of FIG. 1 or 2.

FIG. 5 illustrates an example of a packet flow diagram 400 for system 100. Adapter 106 or 108 receives USB packets 402 from a device. Packets 402 represents information received from a device by one of the adapters 106 or 108 and formatted according to a particular protocol. Packet 402 includes a header 404 and a payload 406. Header 404 stores information used to assist downstream components in identifying, classifying, and routing packet 402. Examples of information stored in header 404 include packet identifiers, vendor identifiers, product identifiers or any other suitable identifying information. Payload 406 is the information that a device is communicating to a destination, as distinguished from header information, which specifies how the information is handled. For example, payload 406 may include commands, files, voice information, video, streaming media, or any other suitable form of information. The depicted USB packets 402 are only one example of the format for packets, and other embodiments may include suitable modifications, such as omission of headers 404 or addition of information to the end of packets 402.

Packets 402 may be accumulated in a buffer until a predetermined number of packets are collected. Packets 402 are then amalgamated into a wireless packet 408. Wireless packet 408 includes an additional USB header 410 that may be used by a receiving adapter 106 or 108 to separate the information into its component parts. Wireless packet 408 also contains a Bluetooth header 412 that includes information used by the Bluetooth protocol to communicate wireless packet as an RF signal 410.

Adapter 106 or 108 that receives RF signal 410 uses the information in Bluetooth header 412 to extract the information 414 from wireless packet 408. Receiving adapter 106 or 108 then examines USB header 410 to identify USB packets 402 within information 414. Once adapter 106 or 108 has identified USB packets 402, adapter 106 or 108 separates packets 402 and communicates them in an appropriate manner to an attached device.

In particular embodiments, slave adapter 106 specifies a size for packets 402 using hardware limitation messages in the USB protocol. Thus, for example, slave adapter 106 may limit the packet sizes received from computer 102 to 32-byte packets, even when computer 102 would ordinarily use 64-byte packets, such as those typically used by USB printers. One advantage of such embodiments is that they allow slave adapter 106 to fix the size of wireless packet 408, which may increase the efficiency of wireless connection 116. The appended USB header 410 is used by master adapter 108 to determine the appropriate packet size limitation according to a shared protocol, and therefore, master adapter 108 may communicate the information to peripheral 104 in the form that peripheral 104 expects.

Adapters 106 or 108 may also communicate different types of information in other ways than the format described. For example, when USB protocol is used to manage physical connections, adapters 106 or 108 may communicate USB control tokens directly without accumulating them into wireless packets 408. This allows adapters 106 and 108 to preserve the timing of token exchange between computer 102 and peripheral 104, reducing the likelihood of errors when computer 102 and peripheral 104 are establishing connections and exchanging information.

Figure 6:
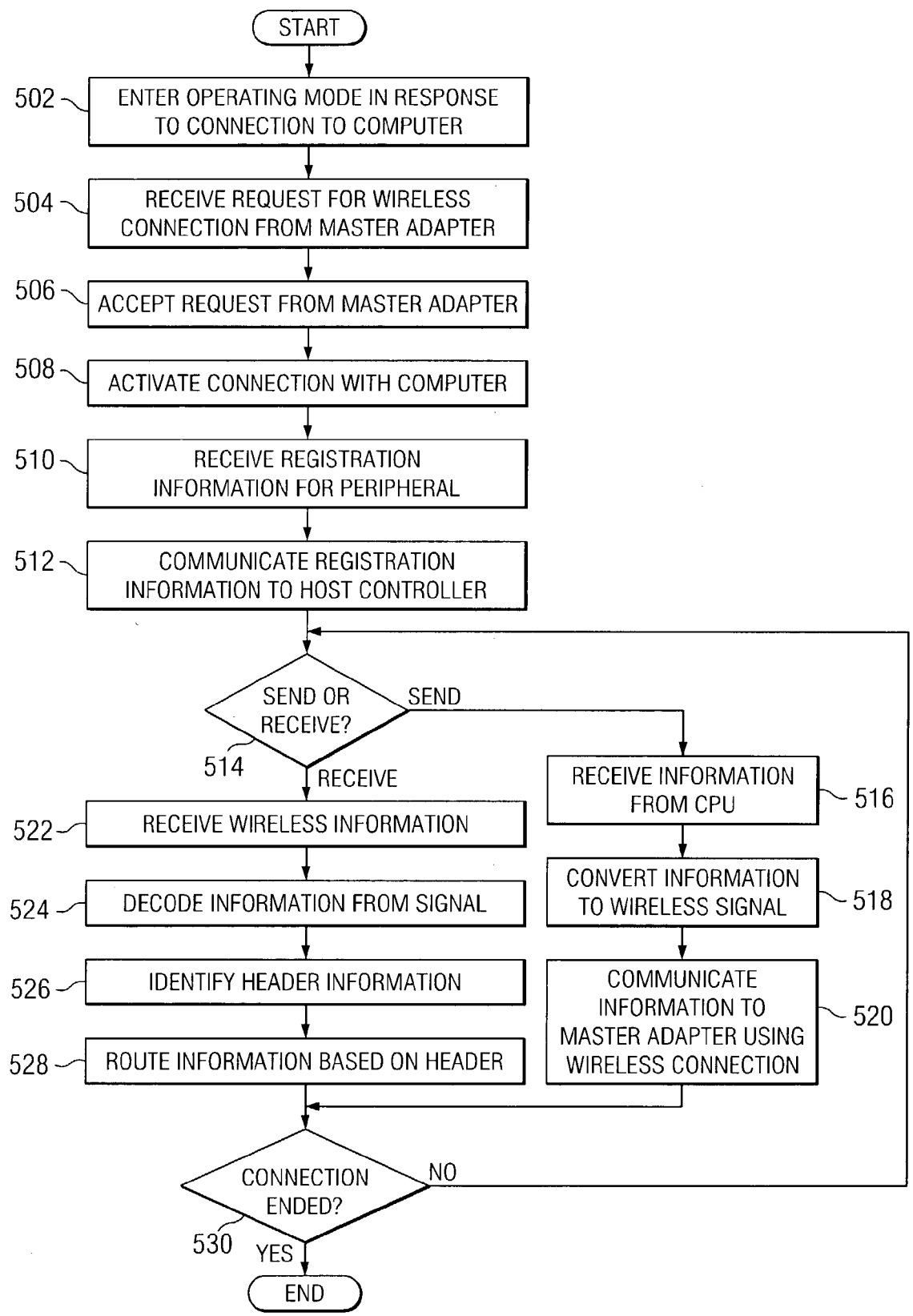
FIG. 6 is a flow chart illustrating one example of a method of operation for a slave adapter.

FIG. 6 shows a flow chart 500 that illustrates one example of a method of operation for slave adapter 106 in which slave adapter 106 remains inactive until a wireless connection is established with master adapter 108. Slave adapter 106 becomes operation in response to detecting a connection to computer 102 at step 502. Slave adapter 106 receives a request for a wireless connection from master adapter 108 at step 504. Slave adapter 106 accepts the request for the wireless connection at step 506, thus establishing wireless connection 116. Once the wireless connection is established, slave adapter 106 activates its connection to computer 102 at step 508, which enables information exchange between computer 102 and slave adapter 106. Slave adapter 106 receives registration information for a peripheral 104 connected to master adapter 108 at step 510 and communicates the registration information to a host controller of computer 102 at step 512, allowing computer 102 to recognize peripheral 104. Once peripheral 104 is registered with computer 102, slave adapter 106 may send and receive information from peripheral 104 using wireless connection 116, which in turn allows computer 102 to interact with peripheral 104 as if peripheral 104 were connected to computer 102 with a wireline connection.

To send information, slave adapter 106 first receives information from computer 102 at step 516. Slave adapter 106 then converts the information to a wireless signal at 518. This conversion may involve changing the information from one format, such as serial data, to another format suitable for wireless communication, such as Bluetooth packets. Slave adapter 106 then communicates the wireless signal to master adapter 108 using the wireless connection at step 520. At step 530, slave adapter 106 continues to send and receive information from step 610 until the communication connection with master adapter 108 or computer 102 ends.

To receive information, slave adapter 106 receives a wireless signal from master adapter 108 at step 522. Slave adapter 106 extracts information from the wireless signal at step 524 and identifies header information at step 526. Based on the header information, slave adapter 106 routes the information appropriately. Routing the information at this step may include performing suitable conversions to present the information in a suitable format to computer 102. At step 530, slave adapter 106 continues to send and receive information from step 610 until the communication connection with master adapter 108 or computer 102 ends.

Figure 7:
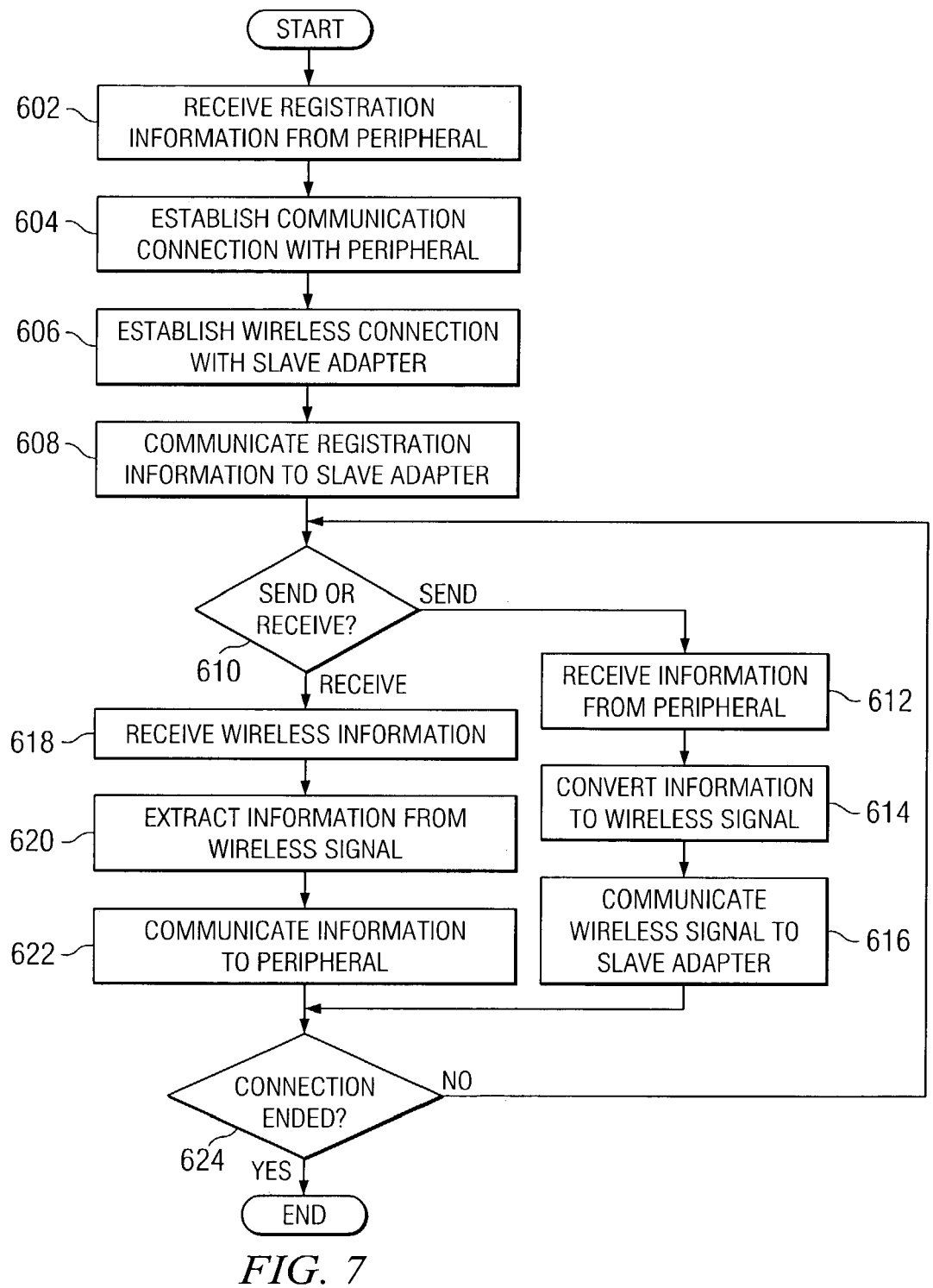
FIG. 7 is a flow chart illustrating one example of a method of operation for a master adapter.

FIG. 7 is a flow chart 600 showing an example of a method of operation for master adapter 108. Although the described steps are presented in a particular order, it should be understood that the steps may be performed in a different order, and various steps may be omitted or replaced without changing the overall operation of the method. Master adapter 108 receives registration information from a peripheral 104 at step 602 and establishes a communication connection with peripheral 104 at step 604. Master adapter 108 detects a slave adapter 106 and establishes a wireless connection with slave adapter 106 at step 606. In response to a request for registration information from computer 102, master adapter 108 communicates the registration information for peripheral 104 to slave adapter 106 at step 608. The registration information is used by slave adapter 106 to allow computer 102 to recognize peripheral 104. Once all of the communication connections are established, master adapter 108 may then send information to computer 102 to receive information from computer 102, as indicated by decision step 610.

To send information, master adapter 108 first receives information from peripheral 104 at step 612. Master adapter 108 converts the information into a wireless signal at step 614. This conversion may include formatting the information from peripheral 104 into a suitable form, such as Bluetooth packets. Master adapter 108 then communicates the information to slave adapter 106 at step 616. At step 624, master adapter 108 continues to send and receive information from step 514 until the connection with either slave adapter 106 or computer 102 ends.

To receive information, master adapter 108 receives a wireless signal from slave adapter 106 at step 618. Master adapter 108 extracts information from the wireless signal at step 620. Master adapter 108 may also perform any suitable conversions of the information to a form usable by peripheral 104, such as converting Bluetooth packets to USB frames. Master adapter 108 then communicates the information to peripheral 104 at step 622. At step 624, master adapter 108 continues to send and receive information from step 514 until the connection with either slave adapter 106 or computer 102 ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for emulating a physical connection using a wireless connection, comprising:
   registering a slave adapter with a host controller through a physical connection between the slave adapter and the host controller;
   in response to registration of the slave adapter, receiving configuration parameters from the host controller;
   establishing a communication session with the host controller according to a first communication protocol;
   establishing a wireless connection with a wireless device coupled to a peripheral;
   receiving a wireless signal comprising peripheral registration information for the peripheral formatted according to a second communication protocol;
   communicating the peripheral registration information to the host controller as part of the communication session to allow the host controller to recognize the peripheral;
   receiving data from as part of the communication session; and communicating, in a manner determined based on the configuration parameters, the data in a wireless signal using the wireless connection.

2. The method of claim 1, wherein the communication session is established on a Universal Serial Bus (USB) connection.

3. The method of claim 1, wherein the wireless connection is a Bluetooth connection.

4. The method of claim 1, wherein the first communication protocol and the second communication protocol are the same.

5. The method of claim 1, wherein the first communication protocol comprises a communication protocol different from the second communication protocol.

6. The method of claim 1, wherein:
the wireless signal is a first wireless signal; and
the method further comprises:
receiving a second wireless signal comprising information generated by the peripheral;
extracting the information from the second wireless signal; and
communicating the information to the host controller as part of the communication session.

7. The method of claim 1, wherein:
the peripheral registration information comprises a vendor identifier and a product identifier; and
the host controller selects a driver corresponding to the peripheral based on the peripheral registration information.

8. The method of claim 1, wherein the peripheral is one of a plurality of peripherals; and further comprising:
establishing a wireless connection with a wireless device coupled to each peripheral;
receiving a wireless signal from each peripheral comprising peripheral registration information for that peripheral formatted according to the second communication protocol; and
communicating the peripheral registration information for each peripheral to the host controller as part of the communication session to allow the host controller to recognize that peripheral.

9. The method of claim 1, wherein establishing the communication session comprises:
forming the physical connection with the host controller; and
maintaining the communication session an inactive state until the wireless connection is established with the wireless device.

10. The method of claim 1, further comprising:
establishing a wireless connection with a plurality of wireless devices; and
exchanging information with each of the wireless devices.

11. The method of claim 1, wherein the communication session is established in a medium selected from the group consisting of: an optical signal, an electrical signal, and a wireless signal.

12. The method of claim 1, wherein the configuration parameters specify a packet size, and wherein communicating the data in a manner determined based on the configuration parameters comprises communicating the data in packets that are sized based on the packet size specified by the configuration parameters.

13. The method of claim 6, wherein the configuration parameters specify the second communication protocol, and wherein extracting the data comprises extracting the data based on the second communication protocol specified by the configuration parameters.

14. A device, comprising:
a device interface operable to establish a communication session with a host controller according to a first communication protocol;
a wireless interface operable to:
receive a wireless signal from a wireless device coupled to a peripheral, the wireless signal comprising peripheral registration information for the peripheral formatted according to a second communication protocol; and
a processor operable to:
register the device with the host controller as part of the communication session;
receive configuration parameters from the host controller in response to registration of the device;
communicate the peripheral registration information to the host controller as part of the communication session in order to allow the host controller to recognize the peripheral;
receive data from the host controller as part of the communication session; and
communicates in a manner determined based on the configuration parameters, the data in a wireless signal using the wireless connection.

15. The device of claim 14, wherein the communication session is established on a Universal Serial Bus (USB) connection.

16. The device of claim 14, wherein the wireless connection is a Bluetooth connection.

17. The device of claim 14, wherein:
the device further comprises a printed circuit board;
the device interface comprises a B connector for USB connections; and
the B connector is integral to the printed circuit board.

18. The device of claim 14, wherein:
the peripheral registration information comprises a vendor identifier and a product identifier; and
the host controller selects a driver corresponding to the peripheral based on the peripheral registration information.

19. The device of claim 14, wherein:
the device further comprises a memory operable to store an encryption key;
the wireless interface is further operable to receive a wireless signal by receiving an encrypted wireless signal; and
the processor is further operable to decrypt the encrypted wireless signal based on the encryption key and to extract the peripheral registration information from the decrypted wireless signal.

20. The device of claim 14, wherein the communication session is established in a medium selected from the group consisting of: an optical signal, an electrical signal, and a wireless signal.

21. The device of claim 14, wherein the first and second communication protocols are the same.

22. The device of claim 14, wherein the first communication protocol comprises a different communication protocol from the second communication protocol.

23. The device of claim 19, further comprising an encryption module operable to couple to the peripheral interface, the encryption module further operable to program the memory with the encryption key.

24. A system, comprising:
a slave adapter operable to:
- register the slave adapter with a first host controller coupled to the slave adapter through a physical connection;
- receive configuration parameters from the first host controller in response to the slave adapter registering with the first host controller;
- receive data from the first host controller having a format specified by a communication protocol; and
- communicate the data in a wireless signal in a manner determined based on the configuration parameters; and a master adapter, comprising:
- a wireless receiver operable to extract the data from the wireless signal; and
- a second host controller operable to establish a communication session with a peripheral according to the communication protocol and further operable to communicate the data to the peripheral.

25. The system of claim 24, wherein the communication protocol is Universal Serial Bus (USB) protocol.

26. The system of claim 24, wherein the wireless signal is a Bluetooth signal.

27. The system of claim 24, wherein:
the slave adapter is one of a plurality of slave adapters, each slave adapter coupled to a computer; and
the slave adapters are further operable to:
- detect the other slave adapters;
- establish wireless connections with the other slave adapters; and
  - exchange information stored by the respective computers of the slave adapters in a manner determined based on configuration parameters received by those slave adapters.

28. The system of claim 24, wherein:
the master adapter is one of a plurality of master adapters, each coupled to a respective peripheral; and
the slave adapter is operable to:
- establish a wireless connection with each of the master adapters; and
- exchange information with the respective peripherals of the master adapters using the wireless connections.

29. The system of claim 24, wherein:
the master adapters are further operable to establish wireless connections with one another; and
the corresponding peripherals exchange information using the wireless connections between the master adapters.

30. The system of claim 24, wherein the configuration parameters specify a packet size and wherein the slave adapter is operable to communicate the data in the wireless signal in a manner determined based on the configuration parameters by communicating the data in packets that are sized based on the packet size specified by the configuration parameters.

31. The system of claim 24, wherein:
the communication protocol comprises a wireline communication protocol;
the configuration parameters specify a wireless communication protocol; and
the slave adapter is operable to communicate the data in the wireless signal in a manner determined based on the configuration parameters by communicating the data according to the wireless communication protocol specified by the configuration parameters.

32. The system of claim 24, wherein:
the peripheral registration information comprises a vendor identifier and a product identifier; and
the host controller is operable to select a driver corresponding to the peripheral based on the peripheral registration information.

33. A system, comprising:
a master adapter, comprising:
- a host controller operable to establish a communication session according to a wireline communication protocol and further operable to receive data formatted according to the wireline communication protocol from the peripheral; and
- a wireless interface operable to communicate the data in a wireless signal; and a slave adapter, comprising:
- a wireless interface operable to receive the wireless signal from the master adapter and to extract the data from the wireless signal;
- a processor operable to:
  - register the slave adapter with a computer through a device interface physically connected to the computer;
  - receive configuration parameters from the computer in response to registering the slave adapter with the computer; and
  - convert, in a manner determined based on the configuration parameters, the extracted data from a wireless communication protocol to the wireline communication protocol; and
- the device interface operable to communicate the converted data to the computer.

34. The system of claim 33, wherein the wireline communication protocol is Universal Serial Bus (USB) protocol.

35. The system of claim 33, wherein the wireless signal is a Bluetooth signal.

36. The system of claim 33, wherein the peripheral is selected from the group consisting of: a printer, a scanner, a digital camera, a web camera, a modem, a personal digital assistant, a PC tablet, a joystick, a mouse, and a keyboard.

37. The system of claim 33, wherein:
the configuration parameters specify a wireless communication protocol; and
the processor is operable to convert the data in a manner determined based on the configuration parameters by converting the extracted data from the wireless communication protocol specified by the configuration parameters to the wireline communication protocol.

38. The system of claim 33, wherein:
the peripheral registration information comprises a vendor identifier and a product identifier; and
the computer is operable to select a driver corresponding to the peripheral based on the peripheral registration information.

* * * * *